US012687212B2

(12) United States Patent
Heon et al.

(10) Patent No.: US 12,687,212 B2
(45) Date of Patent: Jul. 21, 2026

(54) PCR SENSOR FOR AIR SUSPENSION SYSTEM

(71) Applicant: Wheel Pros, LLC, Greenwood Village, CO (US)

(72) Inventors: Reno Heon, San Luis Obispo, CA (US); Dustin Heon, Arroyo Grande, CA (US)

(73) Assignee: Wheel Pros, LLC, Greenwood Village, CO (US)

( * ) Notice: Subject to any disclaimer, the term of this patent is extended or adjusted under 35 U.S.C. 154(b) by 660 days.

(21) Appl. No.: 18/125,285

(22) Filed: Mar. 23, 2023

(65) Prior Publication Data

US 2023/0313858 A1     Oct. 5, 2023

Related U.S. Application Data

(60) Provisional application No. 63/326,013, filed on Mar. 31, 2022.

(51) Int. Cl.
F16F 9/32 (2006.01)
B60G 11/27 (2006.01)
(Continued)

(52) U.S. Cl.
CPC .......... F16F 9/3292 (2013.01); F16F 9/0454 (2013.01); F16F 9/05 (2013.01); F16F 9/055 (2013.01); F16F 9/3271 (2013.01); G01S 7/288 (2013.01); G01S 13/10 (2013.01); B60G 11/27 (2013.01); B60G 2202/152 (2013.01);
(Continued)

(58) Field of Classification Search
CPC .... F16F 9/3292; F16F 9/05; F16F 9/04; F16F 9/0454; F16F 9/055; F16F 9/3271; F16F 2222/126; F16F 2226/04; F16F 2230/08; G01S 7/288; G01S 13/10; B60G 11/27; B60G 2202/152; B60G 2204/111; B60G 2206/80; B60G 2400/252; B60G 2206/42; B60G 2401/00; B60G 2800/162
See application file for complete search history.

(56) References Cited

U.S. PATENT DOCUMENTS

| | | | | |
|---|---|---|---|---|
| 6,073,491 A | * | 6/2000 | Fischer | ................... G01S 7/521 |
| | | | | 73/632 |
| 7,959,137 B2 | * | 6/2011 | Nordmeyer | ............... F16F 9/05 |
| | | | | 267/64.27 |

(Continued)

FOREIGN PATENT DOCUMENTS

| | | | | |
|---|---|---|---|---|
| GB | 2230358 A | * | 10/1990 | ........... B60G 17/016 |

OTHER PUBLICATIONS

European Patent No. EP 1295737 to Eisenmann et al published on Mar. 26, 2003.*

(Continued)

*Primary Examiner* — Pamela Rodriguez
(74) *Attorney, Agent, or Firm* — Womble Bond Dickinson (US) LLP

(57)     ABSTRACT
An air spring height sensor has a PCR (Pulsed-Coherent-Radar) sensor encased in a housing attached to an air spring. The housing also provides an integral channel for adding air to an air spring or releasing air. The PCR sensor is aligned with a connector to orient the sensor with respect to the air spring to accurately determine the height of the air spring.

19 Claims, 3 Drawing Sheets

(51) Int. Cl.

| | |
|---|---|
| *F16F 9/04* | (2006.01) |
| *F16F 9/05* | (2006.01) |
| *G01S 7/288* | (2006.01) |
| *G01S 13/10* | (2006.01) |

(52) U.S. Cl.
CPC ...... *B60G 2206/42* (2013.01); *B60G 2206/80* (2013.01); *B60G 2400/252* (2013.01); *B60G 2401/00* (2013.01); *B60G 2800/162* (2013.01); *F16F 2222/126* (2013.01); *F16F 2226/04* (2013.01); *F16F 2230/08* (2013.01)

(56) References Cited

U.S. PATENT DOCUMENTS

| | | | |
|---|---|---|---|
| 9,694,640 B2 * | 7/2017 | May | B60G 17/019 |
| 2016/0107496 A1 * | 4/2016 | Pielock | B60G 11/27 |
| | | | 267/64.27 |
| 2023/0147844 A1 * | 5/2023 | Heon | B60G 11/27 |
| | | | 280/5.5 |

OTHER PUBLICATIONS

German Patent No. DE 102013108593 to Gudzulic published on Jan. 8, 2015.*
German Patent No. DE 102019212469 to Peters published on Feb. 25, 2021.*
German Patent No. DE 102023212344 to Leinemann et al published on Jun. 20, 2024.*

* cited by examiner

PCR Sensor Integration into Pneumatic Fitting

PCR SENSOR FOR AIR SUSPENSION SYSTEM

CROSS REFERENCE TO RELATED APPLICATIONS

This application claims priority back to U.S. Provisional No. 63/326,013, filed Mar. 31, 2022, the contents of which are incorporated by reference into this utility patent application.

STATEMENT REGARDING FEDERALLY SPONSORED RESEARCH OR DEVELOPMENT

This invention was not federally sponsored.

BACKGROUND OF THE INVENTION

Field of the Invention

This invention relates to air springs for vehicles, and more particularly to pulsed coherent radar to continuously sense the height of an air spring.

Background of the Invention

Known air springs use various means to measure the height of the air spring. However, these products require multiple parts, additional holes drilled or molded into the air spring, and/or replacement of worn parts. Known air springs require extensive effort to repair, such that an air spring with a single worn part may be thrown out rather than fixed.

SUMMARY OF INVENTION

In accordance with the invention an air spring has a PCR (Pulsed Coherent Radar) with both the emitter and receiver housed in a location with respect to the interior of the air spring where they are protected from the elements to avoid problems arising from the necessity of holes in the air spring. Key PCR components are secured and integrated to the air spring with a pneumatic sensor fitting which provides an external air connection and an external electric connection. The PCR sensor is operatively aligned with an internal part of the air spring, whereby the PCR accurately measures the time required to receive the reflected pulses of electromagnetic waves. This time measurement is then filtered and processed by PCR algorithms to calculate the distance between the sensor and the reflector. The reflector can be any selected part of the air spring, such as the air spring lower piston or an air spring lower end cap, among other potential reflectors, as there is no requirement for a dedicated reflector. This non-contact, height-sensing device provides superior air suspension leveling functionality and reduces problems associated with spent components. The design of the invention facilitates repair and servicing of the sensor separate from the air spring and the air spring separate from the sensor.

The invention provides several improvements over existing technologies. Integration of a non-contact sensor greatly reduces installation time. Use of a non-contact sensor avoids problems with mechanically linked sensor parts, as mechanical height sensors have mechanical linkages with slack, which results in both measurement error and deterioration over time. Use of a no-contact sensor increases accuracy over the life of the system.

The elimination of mechanical components also results in improved durability. Mechanical height measuring devices use components that wear out and fail over time. The use of non-contact sensors eliminates the need for mechanical parts that wear out and provides air springs according to the invention an expected lifetime limited only by the life of the vehicle.

Moreover the unit is significantly more rugged than known systems. Known air-spring systems are typically located on the underside of vehicles and to a harsh environment including regular exposure to rain, mud, ice, snow and physical debris.

Thus, there is a need for an air spring that a) protects the sensor from outside, environmental damage, b) provides superior accuracy in measuring the height of the air spring, c) can be installed quickly, and d) has fewer parts that will wear out over time.

DETAILED DESCRIPTION OF THE FIGURES

Figure 1:
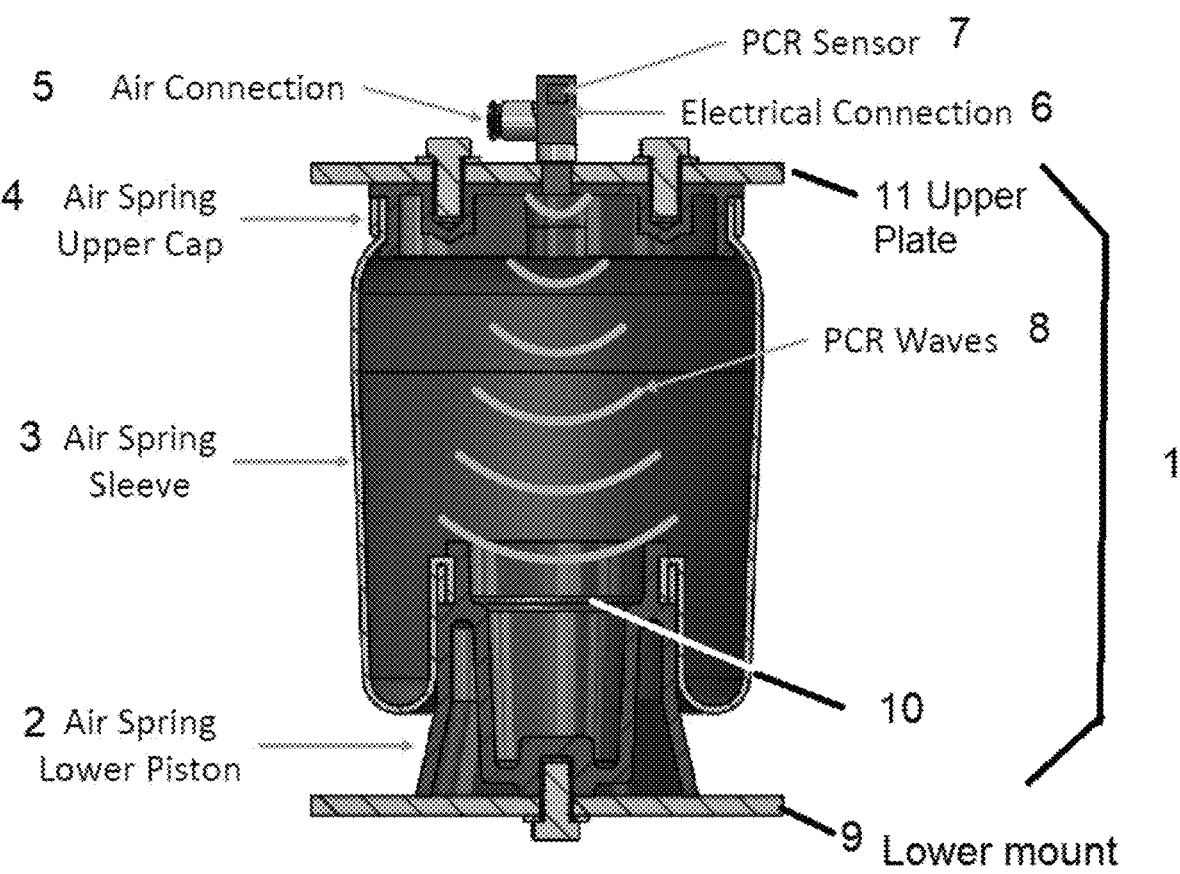
FIG. 1 is a vertical cross-sectional view of a rolling bellows-type embodiment of an air spring in accordance with the invention.

FIG. 1 is a cross-sectional view of a preferred embodiment of an air spring. The air spring assembly, generally referenced as 1, has an air spring lower piston 2 which is attached to a lower mount 9 which is affixed to the vehicle wheel/axle (not shown), and air spring sleeve or bellows 3, and an air spring upper cap 4 with is attached to an upper plate 11 which is affixed to the vehicle chassis. The air spring sleeve 3 is crimped to the air spring lower piston 2 and the air spring upper cap 4. An air connection 5 allows for the input or release of air to maintain the proper air pressure and height of the spring. An electrical connection 6 provides electricity for the PCR Sensor system to function and an output signal from the PCR sensor which is representative of height. A PCR sensor 7 is built into the pneumatic sensor fitting 12 and installed in the air spring upper cap 4 emits continuous pulses of PCR electromagnetic waves 8. These reflect off the lower piston 2 and return to the PCR sensor 7. The PCR sensor 7 determines the time elapse between emission and detection of pulses of reflected electromagnetic waves. This time measurement is then filtered and processed through known algorithms to calculate a representative distance between the sensor 7 and the lower piston 2.

Figure 2:
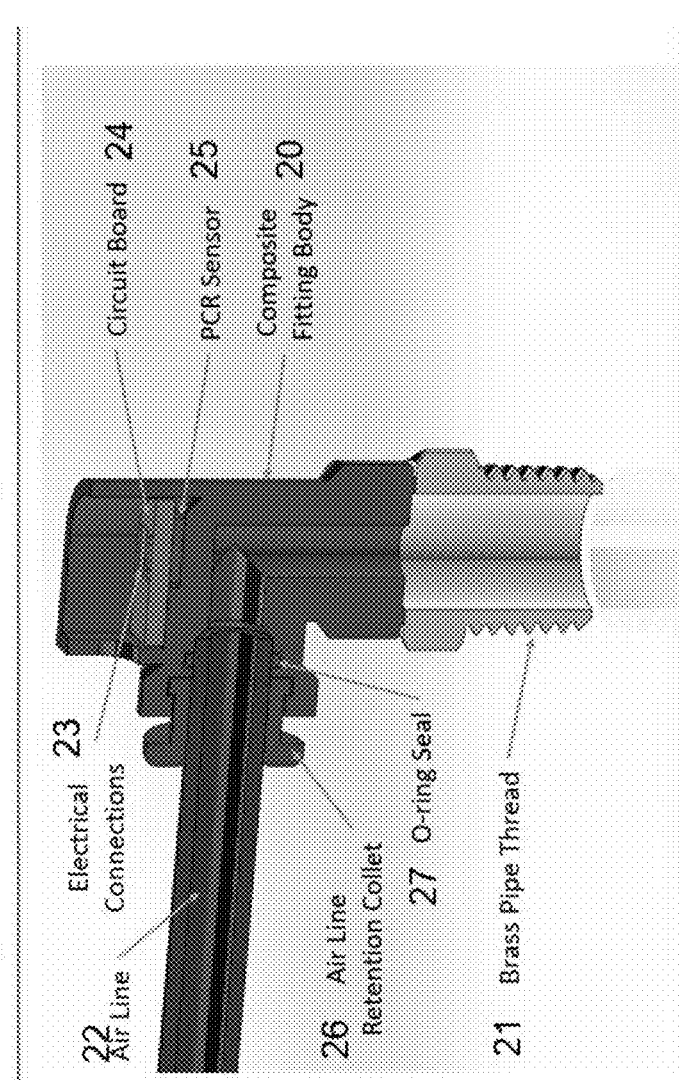
FIG. 2 is a vertical cross-sectional view of a pneumatic sensor fitting in accordance with the invention.

FIG. 2 is a vertical cross-sectional view of a preferred pneumatic sensor fitting 12 in accordance with the invention. A pneumatic sensor fitting body 20, preferable of weather-proof composite material, is removably secured by a threaded tubular coupler 21 to the air spring through a threaded port 13 in the air spring upper cap 11. The pneumatic sensor fitting 12 includes air line 22 attached to pneumatic sensor fitting body 20 by airline retention collet 26 and sealed by O-ring 27. Sealed in pneumatic sensor fitting body 20, to ensure protection from mud, rain, snow and grime that is inevitably sprayed over the air spring located on the underside of a vehicle are a circuit board 24, a PCR sensor 25, and electrical connections 23. pneumatic sensor fitting body 20 provides channel 10 for conducting fluid, such as air, from air line 22 to a fluid exit port 18.

Figure 3:
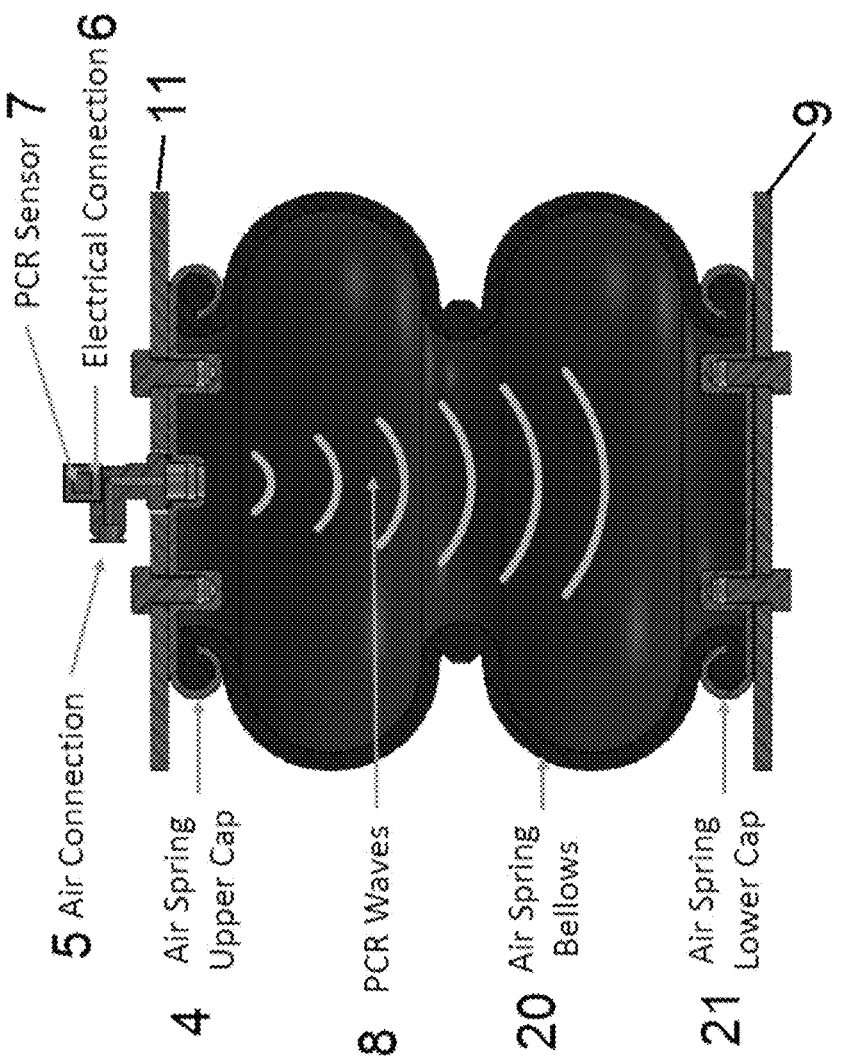
FIG. 3 is a vertical cross-sectional view of an expanding bellows-type air spring in accordance with the invention.

FIG. 3 is a vertical cross-sectional view of the invention integrated into an expanding bellows-type air spring 14. The air spring 14 has an air spring lower cap 16, which is attached to a lower mount 9 which, in turn, is affixed to the vehicle wheel/axle (not shown), and an air spring upper cap 4, which is attached to an upper plate 11 affixed to the vehicle chassis (not shown). The air spring upper cap 4 and air spring lower cap 21 crimp the upper and lower ends of the bellows-type air spring 14, which makes for an airtight connection between the bellows and the upper and lower caps. An air connection 5 allows for the input or release of air to maintain the proper air pressure and height of the spring. An electrical connection 6 provides electric power for the electrical components and carries an output signal from the PCR sensor, which is representative of the height of the air spring. A PCR sensor 7 is built into the pneumatic sensor fitting 12 which is installed in the air spring upper cap 4 and emits continuous pulses of PCR electromagnetic waves 8. These reflect off the lower cap 16 and are detected by the PCR sensor 7. The PCR sensor 7 determines the time delay between emission and detection of the reflected pulses. This time delay is processed by known means to calculate the distance between the sensor 7 and the lower cap 16.

It will be appreciated that the PCR waves 8 can be reflected off any selected part of the air spring, whether the air spring is a rolling bellows-type—or expanding bellows-type air spring. This allows the use of an air spring with fewer parts. As well, both the transmitting portion and the receiving portion of the PCR are housed in same unit to protect these sensitive components in a secure housing and obviate issues arising from housing the components in separate housings, such as the number of holes needed in the air spring body for electrical connections.

In addition to the aforementioned benefits of this invention, it should also be noted that the invention can be retrofitted in existing air springs. This would provide a superior air spring without necessitating a substantial rebuild of the suspension portion of the vehicle.

It should also be noted that the design of this custom pneumatic sensor fitting allows it to be easily retrofitted into vehicles which are already on the road and contain other air springs. Because of the unique design, it should be easy for any installation/repair shop to extract the existing air springs and replace them with the current invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

Many aspects of the invention can be better understood with references made to the drawings as attached. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

What we claim is:

1. An air spring, comprising: an air spring lower piston, an air spring bellows and an air spring upper cap, where the air spring bellows is crimped to the air spring lower piston and the air spring upper cap, such that at least a portion of the air spring bellows rests inside the air spring lower piston and inside the air spring upper cap, where the air spring upper cap additionally comprises an air connection and a PCR sensor, where the PCR sensor emits a constant stream of electromagnetic waves, where each of the constant stream of electromagnetic waves reflects off the lower piston, where a reflected wave is measured by the PCR sensor, where the PCR sensor calculates the air spring height based on a time element, where the time element is the length of time it takes for a single electromagnetic wave to be emitted from the PCR sensor, reflected off the lower piston, and received by the PCR sensor, the air connection of the air spring upper cap including a pneumatic sensor fitting, the pneumatic sensor fitting housing the PCR sensor, the pneumatic sensor fitting having an air line retention collet configured to fluidly couple the air bellows to an air line.

2. The air spring according to claim 1, wherein the pneumatic sensor fitting includes an O-ring seal disposed about the air line within the air line retention collet, the O-ring seal configured to form an air tight seal about the air line.

3. The air spring according to claim 1, wherein the pneumatic sensor fitting includes a brass pipe thread, the pneumatic sensor fitted to a threaded aperture defined by the air spring upper cap by the brass pipe thread.

4. An air spring, comprising: an air spring lower piston, an air spring bellows and an air spring upper cap, where the air spring bellows is crimped to the air spring lower piston and the air spring upper cap, such that at least a portion of the air spring bellows rests inside the air spring lower piston and inside the air spring upper cap, where the air spring upper cap additionally comprises an air connection and a PCR sensor, where the PCR sensor emits a constant stream of electromagnetic waves, where each of the constant stream of electromagnetic waves reflects off the lower piston, where a reflected wave is measured by the PCR sensor, where the PCR sensor calculates the air spring height based on a time element, where the time element is the length of time it takes for a single electromagnetic wave to be emitted from the PCR sensor, reflected off the lower piston, and received by the PCR sensor, the air connection of the air spring upper cap including a pneumatic sensor fitting, the pneumatic sensor fitting comprising a composite body fitting enclosing an electrical connection component, a circuit board, and the PCR sensor, the pneumatic sensor fitting configured to fluidly couple the air bellows to an air line.

5. An air spring device, where the device comprises: an air spring, an air spring upper cap and an air spring lower cap, where the air spring is connected to the air spring lower cap and the air spring upper cap to form an airtight container, where the air spring upper cap additionally comprises an air connection and a PCR sensor, where the PCR sensor emits a constant stream of electromagnetic waves, where each of the constant stream of electromagnetic waves reflects off the lower cap, where a reflected wave is measured by the PCR sensor, where the PCR sensor calculates the air spring height based on a time element, where the time element is the length of time it takes for a single electromagnetic wave to be emitted from the PCR sensor, reflected off the lower cap, and received by the PCR sensor, the air spring upper cap comprising a threaded aperture, a custom pneumatic sensor fitting is fitted with a brass pipe thread to the threaded aperture, the custom pneumatic sensor fitting comprising a composite fitting body which encloses an air line, an electrical connection component, a circuit board, the PCR sensor, an O-ring seal disposed about the air line within an air line retention collet and configured to form an air tight seal about the air line.

6. The device of claim 5, where the air spring is a rolling bellows-type air spring.

7. The device of claim 5, where the air spring is an expanding bellows-type air spring.

8. The device of claim 7, where the expanding bellows-type air spring is a single bellow air spring.

9. The device of claim 7, where the expanding bellows-type air spring is a double bellows air spring.

10. A method of making an improved air spring, comprising: first, manufacturing an airtight air device, where the device comprises: a bellows, an air spring upper cap and an air spring lower element, second, attaching the air spring bellows to the air spring upper cap and the air spring lower element to form an airtight container, third, connecting an air connection, an electrical connection, and a PCR sensor to the airtight container through a brass pipe thread in the air spring upper cap, fourth, causing electricity to flow such that when the PCR sensor emits a constant stream of electromagnetic waves, where each of the constant stream of electromagnetic waves reflects off the lower element, where a reflected wave is measured by the PCR sensor, where the PCR sensor calculates the air spring height based on a time element, where the time element is the length of time it takes for a single electromagnetic wave to be emitted from the PCR sensor, reflected off the lower element, and received by the PCR sensor, where the air line is connected to a composite fitting body of a custom pneumatic sensor fitting by an air line retention collet, an O-ring seal disposed about the air line within the air line retention collet and configured to form an air tight seal about the air line.

11. The device of claim 10, where the air spring is a rolling bellows-type air spring.

12. The device of claim 10, where the air spring is an expanding bellows-type air spring.

13. The device of claim 12, where the expanding bellows-type air spring is a single bellow air spring.

14. The device of claim 12, where the expanding bellows-type air spring is a double bellows air spring.

15. A sensor fitting for an air spring comprising: a body, a no-contact height sensor encased in said body and sealed from an ambient environment of the body, an electrical connection encased in said body and sealed from an ambient environment of the body and in electrical contact with said no-contact height sensor, a fluid supply connection for receiving a fluid supply line, a fluid port, a fluid channel formed in said body for conducting fluid between said fluid supply connection and said fluid port, and a coupler for connecting said fluid port to the air spring, the fluid supply connection being an air line retention collet, the no-contact height sensor configured to emit a constant stream of electromagnetic waves through the fluid port to calculate the height of the air spring when installed thereon.

16. A sensor fitting according to claim 15 wherein said no-contact height sensor comprises a PCR.

17. A sensor according to claim 16 wherein said coupler is threaded.

18. A sensor according to claim 15 in combination with the air spring.

19. The sensor fitting according to claim 15, further comprising an O-ring seal disposed about the fluid supply line within the air line retention collet, the O-ring seal configured to form an air tight seal about the fluid supply line.

\* \* \* \* \*